United States Patent
Kim et al.

(10) Patent No.: US 8,996,248 B2
(45) Date of Patent: Mar. 31, 2015

(54) VIRTUAL SENSOR NETWORK SYSTEM AND METHOD FOR CONVERGENCE OF HETEROGENEOUS SENSORS

(71) Applicants: Hyundai Motor Company, Seoul (KR); Kia Motors Corporation, Seoul (KR); Research & Business Foundation Sungkyunkwan University, Suwon, Gyeonggi-Do (KR)

(72) Inventors: Jinhak Kim, Gyeonggi-Do (KR); Hui Sung Lee, Gyeonggi-Do (KR); Hyoung Geun Kwon, Gyeonggi-Do (KR); Yoonho Jang, Seoul (KR); Yo Han Lee, Gyeonggi-Do (KR); Jin Ho Kim, Gyeonggi-Do (KR); Jae Wook Jeon, Gyeonggi-Do (KR)

(73) Assignees: Hyundai Motor Company, Seoul (KR); Kia Motors Corporation, Seoul (KR); Research & Business Foundation Sungkyunkwan University, Suwon, Gyeonggi-Do (KR)

( * ) Notice: Subject to any disclaimer, the term of this patent is extended or adjusted under 35 U.S.C. 154(b) by 0 days.

(21) Appl. No.: 14/097,754

(22) Filed: Dec. 5, 2013

(65) Prior Publication Data
US 2014/0180539 A1 Jun. 26, 2014

(30) Foreign Application Priority Data
Dec. 20, 2012 (KR) .................. 10-2012-0149949

(51) Int. Cl.
*G06F 7/00* (2006.01)
*G07C 5/00* (2006.01)
(Continued)

(52) U.S. Cl.
CPC ............... *G07C 5/008* (2013.01); *H01Q 1/125* (2013.01); *G06K 19/0717* (2013.01); *G06K 19/04* (2013.01); *H04W 84/18* (2013.01); *H04L 67/12* (2013.01)
USPC ........ 701/36; 370/311; 370/338; 340/539.19; 709/200

(58) Field of Classification Search
CPC ....... H04L 67/12; H04W 84/18; G06K 19/04; G06K 19/0717; H01Q 1/125
USPC ................ 701/36; 370/311, 338; 340/539.19; 709/200
See application file for complete search history.

(56) References Cited

U.S. PATENT DOCUMENTS 8,140,658 B1 * 3/2012 Gelvin et al. .................. 709/224
8,645,022 B2 * 2/2014 Yoshimura et al. .......... 701/32.8
(Continued)

FOREIGN PATENT DOCUMENTS

| JP | 2004-352116 | 12/2004 |
|---|---|---|
| KR | 100230036 | 8/1999 |

(Continued)

*Primary Examiner* — McDieunel Marc
(74) *Attorney, Agent, or Firm* — Mintz Levin Cohn Ferris Glovsky and Popeo, P.C.; Peter F. Corless

(57) ABSTRACT

A virtual sensor network system is provided that includes a virtual sensor node that stores sensor data collected from a sensor mounted within a vehicle in time synchronization therewith and provides the stored sensor data in time synchronization therewith, in addition, a master node performs a control on the virtual sensor node and executes an algorithm used in an intelligent vehicle using the sensor data. The master node receives the sensor data stored in the virtual sensor node as the virtual sensor data in time synchronization therewith, without inputting actual sensor data from the sensor mounted within the vehicle when executing the algorithm.

19 Claims, 3 Drawing Sheets

(51) Int. Cl.
  *H01Q 1/12* (2006.01)
  *G06K 19/07* (2006.01)
  *G06K 19/04* (2006.01)
  *H04W 84/18* (2009.01)
  *H04L 29/08* (2006.01)

(56) References Cited

U.S. PATENT DOCUMENTS

| | | | |
|---|---|---|---|
| 2008/0172177 A1* | 7/2008 | Sherony et al. | 701/301 |
| 2008/0288306 A1* | 11/2008 | MacIntyre et al. | 705/7 |
| 2009/0044761 A1* | 2/2009 | Chapin et al. | 119/720 |
| 2009/0195401 A1* | 8/2009 | Maroney et al. | 340/686.6 |
| 2010/0030421 A1* | 2/2010 | Yoshimura et al. | 701/29 |
| 2010/0050025 A1* | 2/2010 | Grichnik et al. | 714/47 |
| 2011/0093273 A1* | 4/2011 | Lee et al. | 704/270 |
| 2012/0004782 A1* | 1/2012 | Koskan et al. | 700/291 |
| 2013/0098310 A1* | 4/2013 | Chapin et al. | 119/720 |
| 2014/0075043 A1* | 3/2014 | Gerecke | 709/231 |

FOREIGN PATENT DOCUMENTS

| | | |
|---|---|---|
| KR | 10-2009-0086864 | 8/2009 |
| KR | 10-2010-0086481 | 7/2010 |
| KR | 10-2011-0047301 | 7/2010 |
| KR | 10-2012-0049203 | 5/2012 |

* cited by examiner

VIRTUAL SENSOR NETWORK SYSTEM AND METHOD FOR CONVERGENCE OF HETEROGENEOUS SENSORS

CROSS-REFERENCE TO RELATED APPLICATION

This application claims priority to and the benefit of Korean Patent Application No. 10-2012-0149949 filed in the Korean Intellectual Property Office on Dec. 20, 2012, the entire contents of which are incorporated herein by reference.

BACKGROUND (a) Field of the Invention

The present invention relates to a virtual sensor network system, and more particularly, to a virtual sensor network system for convergence of heterogeneous sensors.

(b) Description of the Related Art

An intelligent vehicle is a vehicle that reads interior and exterior information of a vehicle using a sensor, recognizes conditions by processing information based on an algorithm, and performs appropriate measures according to the recognized conditions.

Specifically, various sensors may be used in the intelligent vehicle such as a homogeneous sensor and the sensors each have different characteristics. Additionally, various algorithms may be used such as an algorithm the performs a same function using various methods, and characteristics of a single algorithm may change depending on a change of parameters.

Moreover, each system developed by variously combined sensors and an algorithm may be verified by being applied to a test vehicle and during the verification process and performance according to the changed the sensor and the algorithm may be tested under the same conditions.

However, during the development or changing of the sensor and the algorithm, the process of applying and verifying the developed or changed sensor and algorithm to the test vehicle is required and the development cost and time are consumed due to the driving verification of the test vehicle The above information disclosed in this section is only for enhancement of understanding of the background of the invention and therefore it may contain information that does not form the prior art that is already known in this country to a person of ordinary skill in the art.

SUMMARY

The present invention provides a virtual sensor network system capable of implementing reliable verification during an algorithm development process by reproducing a time deviation of sensor data included in an actual sensor by a virtual sensor network system configuration to which a time synchronization algorithm may be applied.

An exemplary embodiment of the present invention provides a virtual sensor network system that may include a virtual sensor node that stores sensor data collected from a sensor mounted within a vehicle in time synchronization therewith and provides the stored sensor data in time synchronization therewith; and a master node that performs a control on the virtual sensor node and performs an algorithm used in an intelligent vehicle using the sensor data, wherein the master node receives the sensor data stored in the virtual sensor node as the virtual sensor data in time synchronization therewith, without inputting actual sensor data from the sensor mounted within the vehicle while performing the algorithm.

The virtual sensor network system may further include a convergence sensor node that transfers a command from the master node to the virtual sensor node and the virtual sensor data transferred from the virtual sensor node to the master node between the master node and the virtual sensor node. The convergence sensor node may include an algorithm that processes the virtual sensor data transferred from the virtual sensor node. Furthermore, the master node may perform a control to store the sensor data via the virtual sensor node during the driving of the vehicle in time synchronization therewith, and control the virtual sensor node to provide the sensor data stored in the virtual sensor node as the virtual sensor data when the master node is not connected with the vehicle.

The master node and the virtual sensor node each may include: an interface unit that serves as an interface with networks extraneous to the vehicle; a basic function unit that performs a basic function of a node; an algorithm unit (e.g., a processor) mounted with the algorithm for operating components of the node; and an interaction unit that relays mutual data transmission between the basic function unit and the algorithm unit.

The interface unit may include a sensor interface connected with the sensor of the vehicle to operate the sensor and configured to receive the sensor data from the sensor; and a network interface connected with a node of an upper layer or a lower layer to receive command data and transmit sensor data.

The basic function unit may include: a time synchronization module that provides a time period for synchronization; a data storage module that stores the sensor data received from the sensor interface with a time provided from the time synchronization module; and a virtual sensor module that provides the sensor data stored in the data storage module to the node of the upper layer as the virtual sensor data in the time provided from the time synchronization module.

The interaction unit may include: an application programming interface (API) module that provides the functions of the basic function unit to the algorithm unit via a standardized interface; and a standard profile module that converts and provides heterogeneous sensor protocols into a single integrated standard protocol. Furthermore, the time synchronization module of the master node may synchronize the entire time of the virtual sensor network system and the time synchronization may be performed periodically.

The sensor data stored in the data storage module may be converted by the standard profile module and transferred to the node of the upper layer as the virtual sensor data through the virtual sensor module. The sensor data stored in the data storage module may be transferred to the algorithm unit via the API module, processed by the algorithm unit, and transferred to the node of the upper node as the virtual sensor data via the virtual sensor module.

As described above, according to the exemplary embodiment of the present invention, the time deviation of the sensor data included in the actual sensor may be reproduced by the virtual sensor network system configuration which the time synchronization algorithm may be applied, thereby implementing the reliable verification during the algorithm development process.

Further, the sensor interface and the protocol may be unified during the processing of the sensor data by applying the standard profile for the active safety sensor. The unified sensor interface and protocol may be more efficient than the related art that develops the system based on each sensor interface and the protocol, respectively.

Further, the layering of the sensors and the introduction of the convergence node may further improve the complexity of the algorithm as compared to when the single controller processes all the data to improve the efficiency and the stability and the substantial amount of data may be processed by the dispersion processing of the data.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network, coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present invention will be described in detail with reference to the accompanying drawings.

Figure 1:
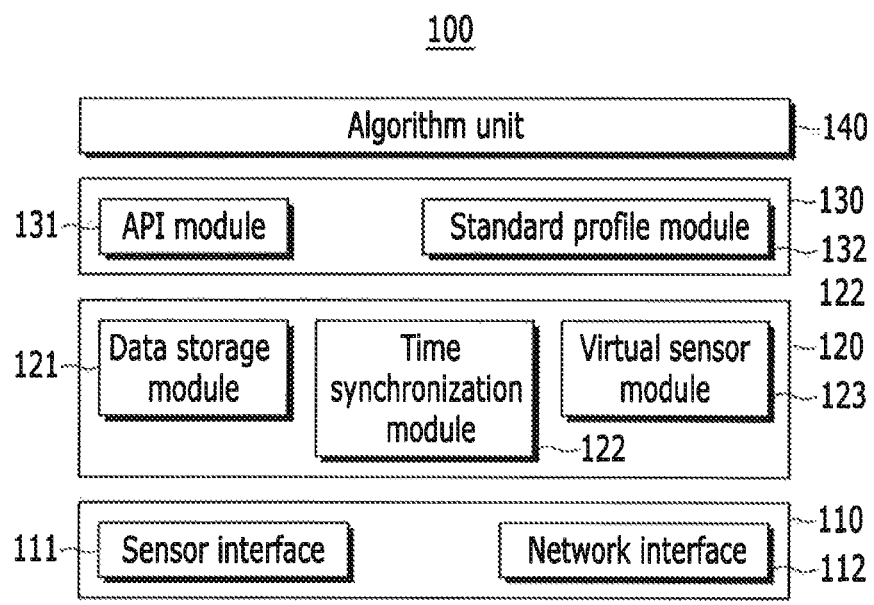
FIG. 1 is an exemplary diagram illustrating a basic node structure configuring a virtual sensor network system according to an exemplary embodiment of the present invention.

FIG. 1 is an exemplary diagram illustrating a basic node structure configuring a virtual sensor network system according to an exemplary embodiment of the present invention. As illustrated in FIG. 1, a basic node structure 100 according to an exemplary embodiment of the present invention may include a plurality of units executed by a controller having a processor and a memory. The plurality of units may include an interface unit 110, a basic function unit 120, an interaction unit 130, and algorithm unit (e.g., a processor) 140.

The interface unit 110 may include a sensor interface 111 and a network interface 112 to provide an interface with networks extraneous to the vehicle. The sensor interface 111 may be configured by a hardware and basic driver connected with the external sensor to transmit and receive sensor data and control data. The network interface 112 may include the hardware and basic driver connected with anode of an upper layer or a lower layer to receive command data or transmit the sensor data. The basic function unit 120 may be configured to perform a basic function for providing a function of the virtual sensor network system and by the basic function, the sensor data received from the sensors of test vehicle are stored under a driving environment in time synchronization therewith and the stored sensor data of heterogeneous sensors may be provided to the upper layer under a laboratory environment in a standard protocol and time synchronization therewith.

The basic function unit 120 may include a data storage module 121, a time synchronization module 122, and a virtual sensor module 123. The data storage module 121, executed by the controller, may be configured to store various sensor data received from the sensor interface 111 along with a receiving time provided from the time synchronization module 121. The time synchronization module 122, executed by the controller, may be synchronized with the time of the upper layer of the virtual sensor network system and may be configured to provide the time stored when the sensor data is stored in the data storage module 121. The virtual sensor module 123, executed by the controller, may be configured to receive the sensor data stored in the data storage module 121 as the sensor data in the standard protocol via the interaction unit 130 and may be configured to synchronize the sensor data based on the transmitting time provided from the time synchronization module 122 and transmit the sensor data to the upper layer via the network interface 112.

The interaction unit 130 may be configured to relay the mutual data transmission between the basic function unit 120 and the algorithm unit 140. In addition, the interaction unit 130 may include an API module 131 and a standard profile module 132. The API module 131, executed by the controller, may be configured to provide functions of the basic function unit 120 to the algorithm unit 140 via the standardized interface to improve the development of the system. The standard profile module 132, executed by the controller, may be configured to convert and provide various heterogeneous sensor protocols into a single integrated standard protocol to improve the development of the system.

Furthermore, the algorithm unit 140 may include the developed algorithm mounted therein and may apply the algorithm to the interface unit 110, the basic function unit 120, and the interaction unit 130 to process the sensor data.

Figure 2:
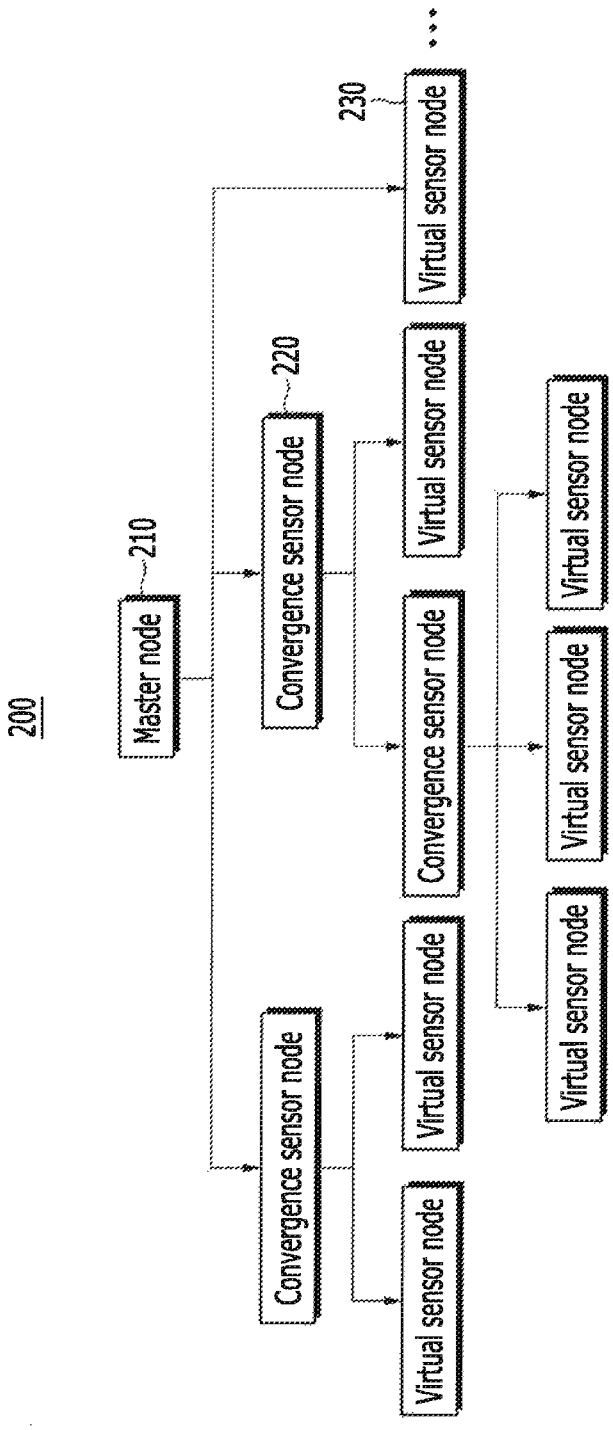
FIG. 2 is an exemplary block diagram of the virtual sensor network system according to an exemplary embodiment of the present invention.

FIG. 2 is an exemplary block diagram of the virtual sensor network system according to an exemplary embodiment of the present invention.

As illustrated in FIG. 2, a virtual sensor network system 200 according to the exemplary embodiment of the present invention may include a master node 210, a convergence sensor node 220, and a virtual sensor node 230. The master node 210, the convergence sensor node 220, and the virtual sensor 230 each may be configured as the basic node structure 100 described with reference to FIG. 1. Further, these nodes may not include all components of the basic node structure 100 according to the usage of each node 210, 220, and 230. For convenience of explanation, components of each node 210, 220, and 230 will be described using reference numerals of the components of the basic node structure 100 described in FIG. 1.

The master node 210 may provide a reference time for synchronizing the total time of the virtual sensor network system 200. In particular, the time synchronization module 122 of the master node 210 may be configured to provide the reference time of the network to each time synchronization module 122 of the convergence sensor node 220 and the virtual sensor node 230.

The algorithm unit (e.g., the processor) 140 of the master node 210 may be configured to execute the algorithm to be actually tested. In addition, the master node 210 may further include a user face (not illustrated) that receives a command from a user or displays data to a user, in addition to the basic node structure 100.

The master node 10 may be connected with the convergence sensor node and/or the virtual sensor node 230 of the lower layer. The convergence sensor node 220 may be configured to transfer the command data transferred from the upper layer to the lower layer and the algorithm unit 140 may be configured to process the sensor data received from the lower layer and provide the processed sensor data to the upper layer. The lower nodes of the convergence sensor node 220 directly connected with the mater node 210 may be hidden and recognized as the single virtual sensor node by the master node 210. The convergence sensor node 220 may be connected with the master node 210 or another convergence sensor node 220 to the upper layer and may be connected with another convergence sensor node 220 and/or the virtual sensor node 230 to the lower layer. In addition, the virtual sensor node 230 may be directly connected with the sensor extraneous to the vehicle under the driving environment to store the sensor data input from the sensor and provide the stored sensor data to the node of the upper layer under the laboratory environment.

Hereinafter, the operation of the virtual sensor network system 200 according to the exemplary embodiment of the present invention will be described with reference to the accompanying drawings.

In both of the driving environment or the laboratory environment, the virtual sensor network system 200 may utilize the time synchronization module 122 of the master node 210 at the time of the initial operation to synchronize the time of the time synchronization module 122 of the convergence sensor node 220 of the lower layer and the virtual sensor node 230 with the time of the master node 210. The time synchronization may be performed periodically.

First, the operation of the virtual sensor network system 200 under the driving environment will be described with reference to FIG. 3.

Figure 3:
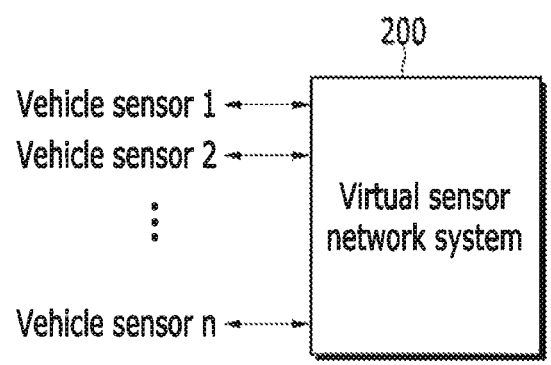
FIG. 3 is an exemplary diagram illustrating a configuration in which the virtual sensor network system according to an exemplary embodiment of the present invention is connected with a sensor of a vehicle for a driving environment operation.

FIG. 3 is an exemplary diagram illustrating a configuration in which the virtual sensor network system according to an exemplary embodiment of the present invention is connected with a sensor of a vehicle for a driving environment operation.

Referring to FIG. 3, the virtual sensor network system 200 may be connected with various types of sensors that are mounted within the test vehicle for collecting the test sensor data under the driving environment. In particular, the sensor interface 111 of the virtual sensor node 230 of the virtual sensor network system 200 may be connected with the sensor of the vehicle.

As described above, when the virtual sensor network system 200 is configured within the test vehicle, the algorithm unit 140 of the master node 210 may be configured to transfer a command for storing the sensor data to the convergence sensor node 220 and the virtual sensor node 230. Therefore, the virtual sensor node 230 of the lower layer of the virtual sensor network system 200, that is, the virtual sensor node directly connected with the sensor of the test vehicle may be configured to receive a command received from the upper layer via the network interface 112. In particular, the received command may be converted into a unique protocol of the sensor by the standard profile module 132 of the interaction unit 130 and may be transferred to the sensor via the sensor interface 111 to execute the operation of the sensor.

In this configuration, when the test vehicle is driven, the virtual sensor node 230 may be configured to store the sensor data output from the sensors of the test vehicle. In particular, the sensor data output from the sensor of the test vehicle may be received via the sensor interface 111 and the sensor data may be stored in the data storage module 121 along with the receiving time provided from the time synchronization module 122.

Moreover, the sensor data received via the sensor interface 111 according to the setting of the virtual sensor network system 200 may be converted into the standard protocol using the standard profile module 132, transferred to the exterior via the virtual sensor module 123 or processed by the algorithm unit 140 via the API module 131, transferred to the virtual sensor module 123, and transferred to the exterior via the network interface 112 along with the time provided from the time synchronization module 122. The sensor data storage may end by the command of the master node 210 or end by the driving completion of the test vehicle.

Next, the operation of the virtual sensor network system 200 under the laboratory environment will be described. The laboratory environment corresponds to the reproduction of the driving environment of the test vehicle based on the sensor data collected and stored in the driving environment.

The algorithm unit 140 of the master node 210 may be configured to transfer the command for reproducing the driving environment using the virtual sensor based on the collected and stored sensor data to the convergence sensor node 220 and the virtual sensor node 230. Therefore, the virtual sensor node 230 of the lower layer may be configured to receive a command directly transferred from the master node 210 or transferred through the convergence sensor node 220, via the network interface 112.

The data storage module 121 of the virtual sensor node 230 may be configured to transfer the stored sensor data to the standard profile module 132 and the standard profile module 132 may be configured to convert the sensor data into the standard protocol and transfer the sensor data to the virtual sensor module 123. Alternatively, the data storage module 122 may be configured to transfer the sensor data to the algorithm unit 140 via the API module 131 and the algorithm unit 140 may be configured to perform the appropriate processing and transfer the processed sensor data to the virtual sensor module 123.

The virtual sensor module 123 may be configured to transfer the sensor data transferred from the standard protocol module 132 or the sensor data transferred from the algorithm unit 140 to the convergence sensor node 220 or the master node 230 of the upper layer via the network interface 112 in the transmitting time provided from the time synchronization module 112.

Moreover, the time synchronization module 122 of the virtual sensor module 123 may be configured to determine the transmitting time by referring to the sensor data stored in the data storage module 121 and the receiving time. Therefore, the virtual sensor module 123 may be configured to provide the sensor data collected under the driving environment by the transmitting time provided from the time synchronization module 122 as the virtual sensor data even in the laboratory environment, and similarly the time collected under the driving environment.

Furthermore, when the convergence sensor node 220 receives the sensor data from the sensor node of the lower layer, that is, another convergence sensor node 220 or the virtual sensor node 230 via the network interface 112, the convergence sensor node 220 may be configured to process the corresponding sensor data using the algorithm unit 140 via the API module 131, transfer the sensor data to the virtual sensor module 123, and transfer the sensor data to the node of the upper layer via the network interface 112 in the transmitting time provided from the time synchronization module 122.

As described above, at the time of the driving of the test vehicle, the sensor data collected through the sensor may be stored in time synchronization therewith and generated as the virtual sensor data under the laboratory environment and transferred to the upper layer, that is, finally the master node 210, thereby implementing the virtual sensor even though there is no sensor data from the actual sensor of the test vehicle.

The operation of the virtual sensor network system 200 according to the exemplary embodiment of the present invention is described above, but the utilization of the developing tool using the virtual sensor network system 200 according to the exemplary embodiment of the present invention will be described below.

At the time of the driving of the test vehicle, the sensors may be mounted within the test vehicle and each sensor may be connected with the virtual sensor node 230. Here, each virtual sensor node 230 may be connected with a lower network of the master node 210. The lower nodes connected with the master node 210 may be set using the user interface of the master node 210. To perform the algorithm test in real time while storing the sensor data during the driving, the algorithm unit 140 of the master node 210 may include an algorithm to be tested.

For the algorithm test in real time during the driving, the lower network may be configured via the convergence sensor node 220. Therefore, the algorithm unit 140 of the convergence sensor node 220 may include the algorithm to be tested. During the driving of the test vehicle, the sensor data from the sensor may be stored in each virtual sensor node 230 along with the receiving time synchronized with the master node 210. After the driving of the test vehicle ends, the driving environment may be reproduced under the laboratory environment. In particular, the data storage module 121 of the virtual sensor node 230 may be configured to store the sensor data of each condition collected during the driving of the test vehicle.

The entire network may be set by the master node 210 and each algorithm may be verified during the replacement of the algorithm included in the algorithm unit 140 of the master node 210, the convergence sensor node 220, and the virtual sensor node 230.

Meanwhile, the virtual sensor network system 200 according to the exemplary embodiment of the present invention may also be used for the intelligent safety system. First, the sensor mounted within the test vehicle may be connected with the virtual sensor node 230. In particular, the data storage module 121 may be omitted from the virtual sensor node 230.

The virtual sensor node 230 may be configured to provide the sensor protocol interface integrated by the standard profile module 132 to the upper layer during communication with the sensor and the convergence sensor node 220 may be configured to process the sensor data from the lower layer and transfer the processed sensor data to the upper layer. The master node 210 may be configured to process the sensor data from the lower layer and provide the processed sensor data to the intelligent safety system.

While this invention has been described in connection with what is presently considered to be exemplary embodiments, it is to be understood that the invention is not limited to the disclosed embodiments, but, on the contrary, is intended to cover various modifications and equivalent arrangements included within the spirit and scope of the accompanying claims.

| Description of symbols | |
|---|---|
| 100: Basic node structure | 110: Interface unit |
| 120: Basic function unit | 130: Interaction unit |
| 140: Algorithm unit | 111: Sensor interface |
| 112: Network interface | 121: Data storage module |
| 122: Time synchronization module | 123: Virtual sensor module |
| 131: API module | 132: Standard profile module |
| 200: Virtual sensor network system | |
| 210: Master node | 220: Convergence sensor node |
| 230: Virtual sensor node | |

What is claimed is:

1. A virtual sensor network system, comprising:
   a virtual sensor node that stores sensor data collected from a sensor mounted within a vehicle in time synchronization therewith and provides the stored sensor data in time synchronization therewith; and
   a master node that performs a control on the virtual sensor node and executes an algorithm used in an intelligent vehicle using the sensor data,
   wherein the master node receives the sensor data stored in the virtual sensor node as the virtual sensor data in time synchronization therewith, without inputting actual sensor data from the sensor mounted within the vehicle when executing the algorithm.

2. The virtual sensor network system of claim 1, further comprising:
   a convergence sensor node that transfers a command from the master node to the virtual sensor node and the virtual sensor data transferred from the virtual sensor node to the master node between the master node and the virtual sensor node.

3. The virtual sensor network system of claim 2, wherein:
   the convergence sensor node includes an algorithm that processes the virtual sensor data transferred from the virtual senor node.

4. The virtual sensor network system of claim 1, wherein:
   the master node stores the sensor data via the virtual sensor node during driving of the vehicle in time synchronization therewith, and
   operates the virtual sensor node to provide the sensor data stored in the virtual sensor node as the virtual sensor data when the virtual sensor node is not connected with the vehicle.

5. The virtual sensor network system of any one of claims 4, wherein:
- the master node and the virtual sensor node each includes:
  - an interface unit that serves as an interface with networks extraneous to a vehicle; and
  - a controller configured to:
    - execute a basic function of a node; and
    - execute components of the node using an algorithm.

6. The virtual sensor network system of claim 5, wherein the interface unit includes:
- a sensor interface connected with the sensor of the vehicle to operate the sensor and receive the sensor data from the sensor; and
- a network interface connected with a node of an upper layer or a lower layer to receive command data and transmit sensor data.

7. The virtual sensor network system of claim 6, wherein controller is further configured to:
- provide a time period for synchronization;
- store the sensor data received from the sensor interface and a time for the time synchronization; and
- provide the stored sensor data to the node of the upper layer as the virtual sensor data in the provided time.

8. The virtual sensor network system of claim 7, wherein the controller is further configured to:
- provide the functions of the node via a standardized interface; and
- convert and provide heterogeneous sensor protocols into a single integrated standard protocol.

9. The virtual sensor network system of claim 8, wherein the configured is further configured to:
- synchronize an entire time of the virtual sensor network system.

10. The virtual sensor network system of claim 8, wherein the controller is further configured to:
- convert and transfer the stored sensor data to the node of the upper node as the virtual sensor data.

11. The virtual sensor network system of claim 8, wherein the controller is further configured to:
- process the stored sensor data using the algorithm and transfer the processed sensor data to the node of the upper layer as the virtual sensor data.

12. A method of converging sensors in a virtual sensor network system, the method comprising:
- executing, by a controller, a basic function of a node;
- executing, by the controller, components of the node using an algorithm;
- executing, by the controller, a sensor interface connected with the sensor of a vehicle to operate the sensor and receive the sensor data from the sensor; and
- executing, by the controller, a network interface connected with a node of an upper layer or a lower layer to receive command data and transmit sensor data.

13. The method of claim 12, further comprising:
- providing, by the controller, a time period for synchronization;
- storing, by the controller, the sensor data received from the sensor interface and a time for the time synchronization; and
- providing, by the controller, the stored sensor data to the node of the upper layer as the virtual sensor data in the provided time.

14. The method of claim 13, further comprising:
- providing, by the controller, the functions of the node via a standardized interface; and
- converting and providing, by the controller, heterogeneous sensor protocols into a single integrated standard protocol.

15. The method of claim 14, further comprising:
- synchronizing, by the controller, an entire time of the virtual sensor network system.

16. The method of claim 14, further comprising:
- converting and transferring, by the controller, the stored sensor data to the node of the upper node as the virtual sensor data.

17. The method of claim 14, further comprising:
- processing, by the controller, the stored sensor data using the algorithm and transfer the processed sensor data to the node of the upper layer as the virtual sensor data.

18. A non-transitory computer readable medium containing program instructions executed by a controller, the computer readable medium comprising:
- program instructions that execute a basic function of a node;
- program instructions that execute components of the node using an algorithm;
- program instructions that control a sensor interface connected with the sensor of a vehicle to operate the sensor and receive the sensor data from the sensor; and
- program instructions that control a network interface connected with a node of an upper layer or a lower layer to receive command data and transmit sensor data.

19. The non-transitory computer readable medium of claim 18, further comprising:
- program instructions that provide a period for time synchronization;
- program instructions that store the sensor data received from the sensor interface and a time for the time synchronization; and
- program instructions that provide the stored sensor data to the node of the upper layer as the virtual sensor data in the provided time.

* * * * *